Patented June 7, 1938

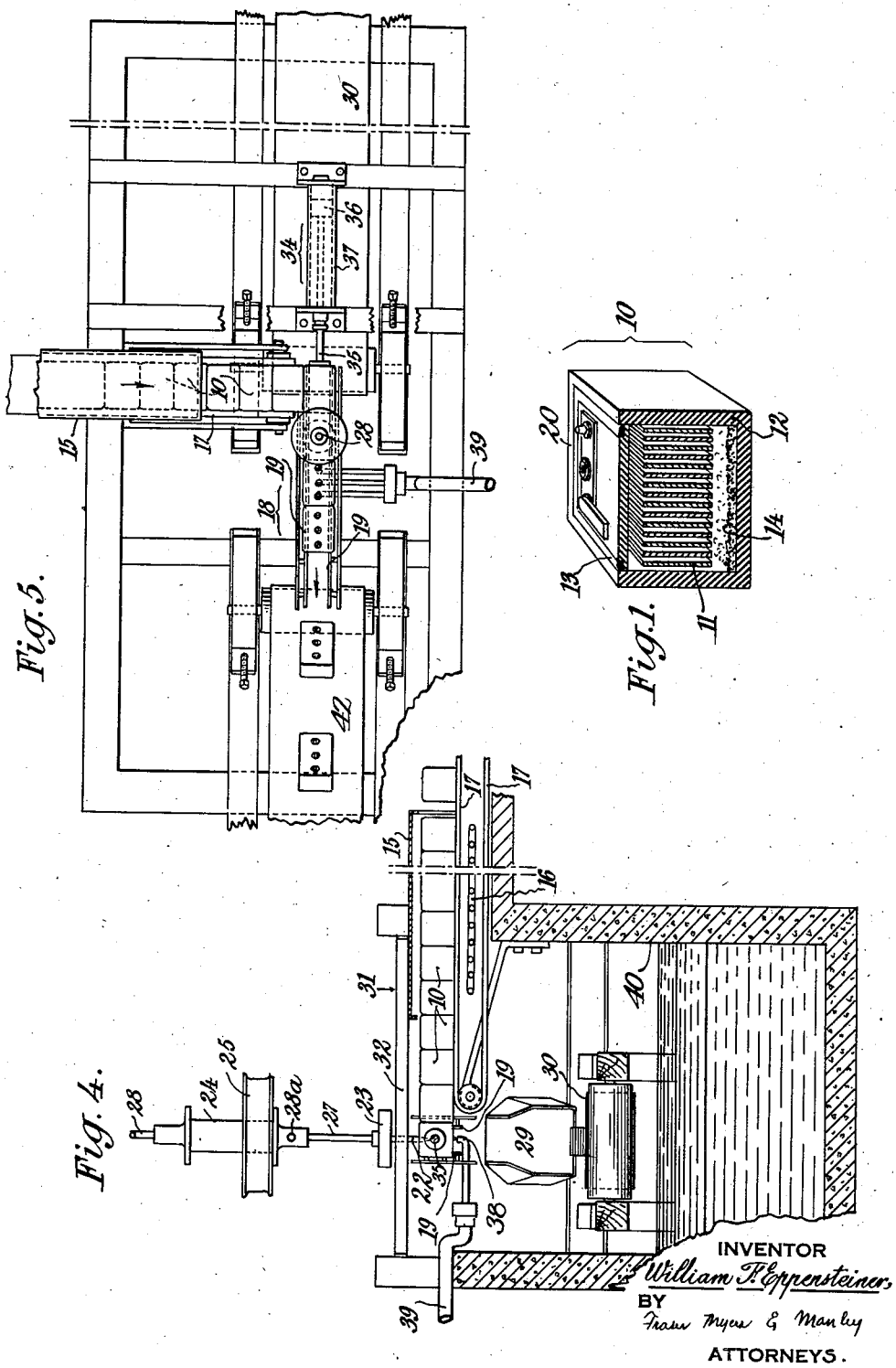

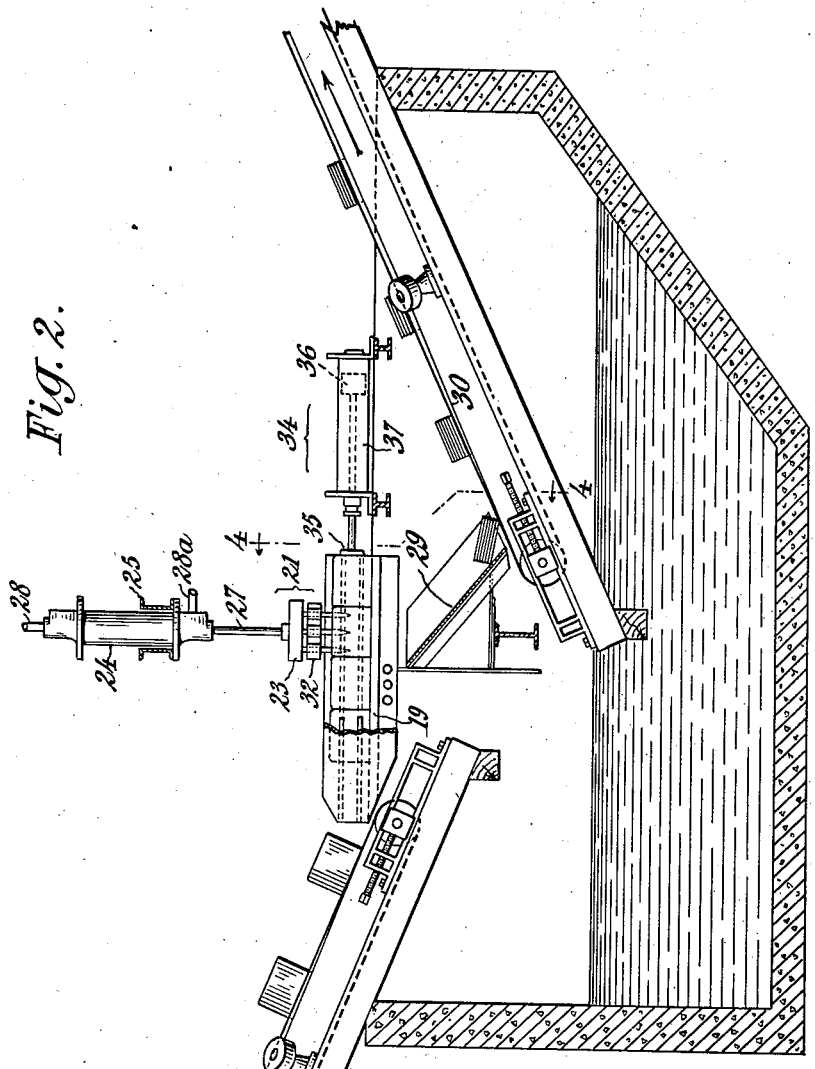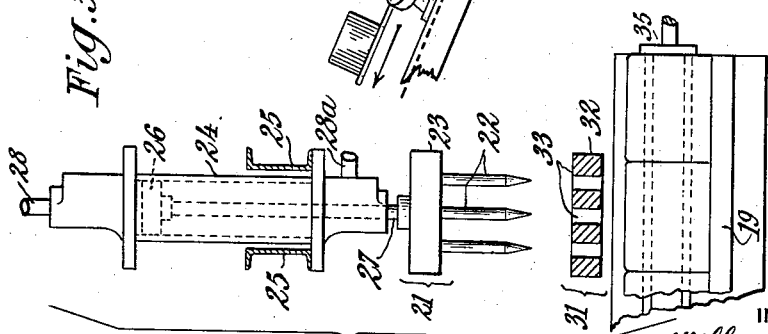

2,119,858

UNITED STATES PATENT OFFICE

2,119,858

STORAGE BATTERY STRIPPER

William F. Eppensteiner, Rahway, N. J., assignor to The American Metal Company, Limited, New York, N. Y., a corporation of New York Application July 12, 1935, Serial No. 31,032

5 Claims. (Cl. 136—174)

This invention relates to the salvaging of storage batteries, and more particularly to the method of and means for removing the plate sections of such batteries from their casings.

It is well known that storage batteries of the type used in motor vehicles, railroad cars, and the like, have a considerable salvage value after they have lost their primary usefulness. Such batteries generally comprise a plurality of spongy metal, and metal oxide, plates which are joined together as a unit and sealed into a cheap insulating casing. The salvage value of batteries of this type lies principally in the plates, or in the sludge which collects in the base of the casings; the casing being substantially valueless. In the salvaging process, therefore, it is desirable to remove the valuable plates and sludge from the valueless casings at the least possible cost. In the past this has been done either by breaking the casings, or by removing the seal by hand. Both of these prior methods were costly, and further, a considerable portion of the valuable sludge was lost. Further, when the casings are broken up they become difficult to handle; and since the casing generally represents a loss, any reduction which can be effected in the cost of handling it represents a substantial monetary gain.

It is an object of the present invention to remove the plate sections of the battery without destroying the casing, thereafter to wash the casings to recover a maximum amount of the sludge, and then to dispose of the casings at a minimum expenditure of time and effort. Other objects and various features of the invention will be more apparent from the following description when read in connection with the appended drawings in which—

Figure 1 is a fragmentary perspective view of a storage battery;

Fig. 2 is an elevational view partly in section of an apparatus for carrying out the objects of the invention;

Fig. 3 is an elevational view partly in section on an enlarged scale of a portion of the apparatus of Fig. 2;

Fig. 4 is a sectional view taken on the line 4—4 of Fig. 2; and

Fig. 5 is a plan view of the apparatus of Fig. 2.

In general, a battery 10 (Fig. 1) of the type with which the present invention is concerned, comprises a plate section 11 which is sealed into a cheap insulating casing 12 by means of asphaltum or other material 13. The plates are usually formed by pressing sponge lead, or lead oxide, into a supporting grid, in a well-known manner. Thus, when batteries of this type are subjected to constant vibration, as in an automobile, the spongy material tends to break away from its supporting grid and to collect in the bottom of the casing 12 as a sludge 14. In the salvaging of such batteries according to the present invention, I pass a tool, or tools, through the bottoms of the casings at one or more points, the tool or tools engaging the group of plates at their bottom edges and the plates transmitting the force of the tools to the seal, thus breaking the latter. Once the seal has been broken, the plate sections 11 may be removed in any desired manner. Preferably the movement of the tool is continued to force the plates from the casing, and this is best accomplished by arranging the casings in an inverted position for the punching operation so that gravity assists in the removal of the plates. I have found it preferable to subject the batteries to the action of heat prior to the punching operation, particularly if there is any chance of their having been frozen, and this heating operation is also desirable since it softens the seal and permits an easier displacement of the latter. The empty casings, which are not broken except at one or more points in the bottom thereof, are then subjected to a washing action for the purpose of recovering a maximum amount of the sludge.

An apparatus for carrying out the above described method, as shown in the drawings, comprises a tunnel-like chamber 15 which is heated to a desired temperature by means of heating elements 16. The heating elements may be steam coils, electrical resistance units, gas burners, or the like. A conveyor 17 traverses the heating chamber and moves a line of batteries 10 therethrough, whereby they may be heated to any desired degree,—200° F., for example,—and their seals softened to the desired extent. Preferably, the batteries are mounted upon the conveyor with their longitudinal center lines at right angles to the direction of movement; and with their sealed sides downwards. When the seal has been softened to the desired extent the conveyor 17 deposits the battery upon a bed 18, which, for the purpose of conserving space, is preferably disposed at right angles to the conveyor 17. The bed may be of any desired construction, but, for reasons which will later appear, it preferably comprises a pair of rails 19 which engage only the longitudinal edge portions 20 of the battery casing 12, the plate section 11 being unsupported except by the seal 13. Mounted above the bed is a vertically reciprocal punch 21. Preferably the punch comprises one or more bars 22 which are sharpened at their lower ends, and joined together at their upper ends by means of a bridge 23. The punch may be driven in any desired manner, but as here shown the driving means comprises a cylinder 24 which is supported by suitable channel beams 25. The cylinder is provided with a piston 26 and a piston rod 27, the latter being operably connected to the bridge 23 of the punch 21. A working fluid, either compressed air, steam, liquid under pressure, or any other desired medium, is introduced into the top of the cylinder through a pipe 28, thus forcing the piston 26 downward and driving the sharpened ends of the punch 21 through the bottom of the casing 12, thus applying a force to the plate section 11 of the battery which is sufficient to break the seal 13. Once this seal is broken the heavy plate section 11, being unsupported as was previously mentioned, escapes from the casing by gravity, and falls upon a chute 29 which deposits it upon a conveyor 30. The conveyor 30, which may be of any desired character, carries the plate sections away to be melted down and purified.

Upon the retraction of the piston 26, which may be accomplished by a spring (not shown) or by introducing the working fluid into the cylinder on the underside of the piston as through pipe 28a, the punch 21 is withdrawn from the casing, leaving it substantially unbroken except for the points at which the punch is passed through the bottom thereof. In order to insure the removal of the casing from the bars of the punch, a stripping guide 31 is interposed between the punch and the batteries. This guide may comprise a stationary plate 32 having a plurality of holes 33 therein through which the bars 22 of the punch may pass. If the casing tends to stick to the punch it will encounter the stripping guide and be held thereby while the punch is withdrawn. When this operation is complete the empty casing is moved along the bed 18, to be washed as will presently be described, and an unsalvaged battery is simultaneously moved under the punch. This may be accomplished in a single operation by means of a pusher feed mechanism 34. The feed mechanism may be of any desired type, and, as here shown, it comprises a head 35 which is reciprocated by means of a piston 36 operating within a cylinder 37, any desired medium being utilized to accomplish a reciprocation of the piston.

The washing of an empty casing to recover the sludge may most readily be done by supporting it with its open top downward and directing a stream of water upward against its bottom. The force of the stream dislodges the sludge, which then escapes by gravity. Since the casings on the bed are upside down, this washing step fits into the process very nicely. Thus, when the pusher 34 advances an unsalvaged battery under the punch, as above described, it likewise pushes an empty casing along the bed. Beneath the point at which the empty casing momentarily comes to rest I preferably provide a plurality of upwardly directed nozzles 38 which are supplied with water from a main 39. The resulting streams of water strike against the bottom of the casing and dislodge the sludge as above described. The mixture of sludge and water, of course, falls and is collected in a sump 40, from which it may be withdrawn and concentrated. A hood may be positioned over the bed at this point to reduce any splashing and splattering which may be occasioned by the washing process. When the washing step is completed the next succeeding operation of the pusher deposits it upon a conveyor 42, which conveyor carries it away to any desired place.

As is apparent from the foregoing, my invention provides a method and means for positively removing the plate sections of batteries from their casings in an extremely simple manner and yet one which is highly effective. Further, the invention achieves a maximum recovery at a minimum expense. Again, as is apparent, the apparatus of my invention lends itself very readily to a high speed automatic stripping of the batteries in which no manual steps are required.

Since certain changes may be made in the embodiment of the invention without in any way departing from its scope, it is intended that the foregoing description and the drawings shall be construed in an illustrative rather than a limiting sense.

I claim:

1. An apparatus for stripping storage batteries of the type having a plate section sealed within a casing comprising a battery supporting bed having a pair of parallel rails so spaced apart as to engage only the edge portions of the casing of a battery mounted thereon, a punch having a free end directed towards said bed, and means for reciprocating said punch towards and away from the bed, said punch having a normal travel such that when driven towards the bed its free end will pass through the casing of a battery supported on the bed and into the plate section thereof.

2. An apparatus for stripping storage batteries of the type having a plate section sealed within a suitable casing comprising a supporting bed having a pair of parallelly and horizontally mounted rails so spaced apart as to be capable of engaging only the edge portions of the casing of a battery positioned thereon with its sealed side directed downwardly, and to leave a free area therebetween of such dimensions that the plate section of a battery when separated from its casing may pass therethrough, by gravity, a vertically disposed punch having a free end which normally occupies a position above the space occupied by batteries supported on the bed, and means for reciprocating said punch whereby its free end successively may pass through the casing, into the plate section of a battery supported on the bed to break the seal between the plate section and the battery casing and then be withdrawn to its normal position.

3. An apparatus for stripping storage batteries of the type having a plate section sealed within a suitable casing comprising a supporting bed having a pair of horizontally disposed rails so spaced apart as to engage only the side edge portions of the casing of a battery positioned thereon, and being of such length as to be capable of accommodating a plurality of such batteries, a vertically reciprocable punch located between the ends of the bed with its free end normally disposed above the space occupied by batteries, means for reciprocating the punch through a normal travel such that when the punch descends its free end will pass through the casing and into the plate section of a battery supported on the bed, a conveyor located adjacent one end of the bed and at right angles thereto for successively depositing batteries thereon, a pusher mounted axially of the bed adjacent the conveyor with its head normally retracted to such position as to permit the movement of batteries onto the bed, and means for reciprocating the pusher so as successively to advance batteries along the bed and beneath the punch.

4. An apparatus substantially in accordance with claim 2, further characterized by the provision of a stripper element located between the position normally occupied by the free end of the punch, and the space above the bed normally occupied by batteries supported thereon, and said element being adapted to engage a battery casing and strip it from the punch when the latter is receding from the bed.

5. An apparatus for stripping storage batteries according to claim 3 further characterized by the provision of a heater located under the conveyor for heating the batteries thereon and thereby softening the seals thereof.

WILLIAM F. EPPENSTEINER.